UNITED STATES PATENT OFFICE.

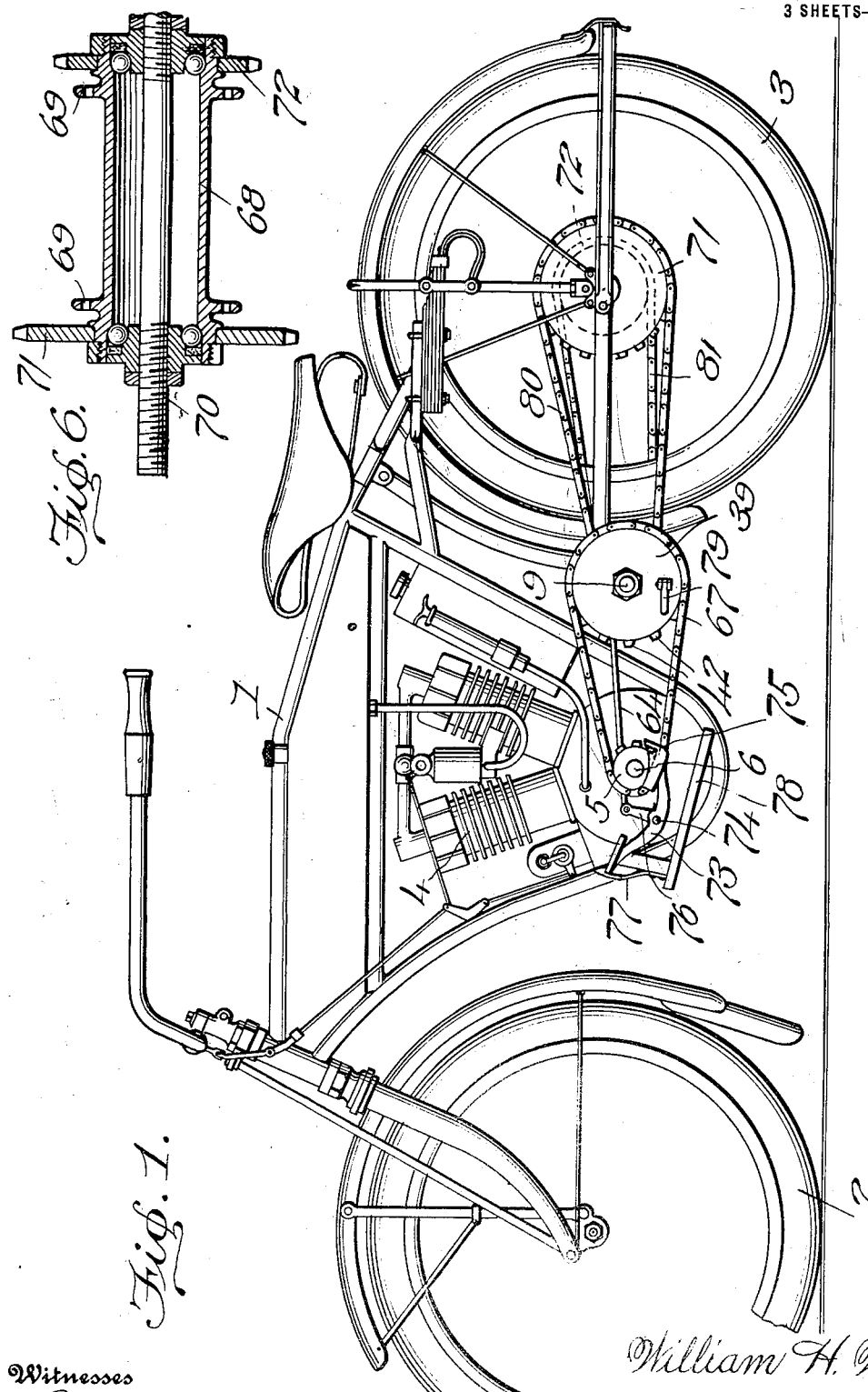

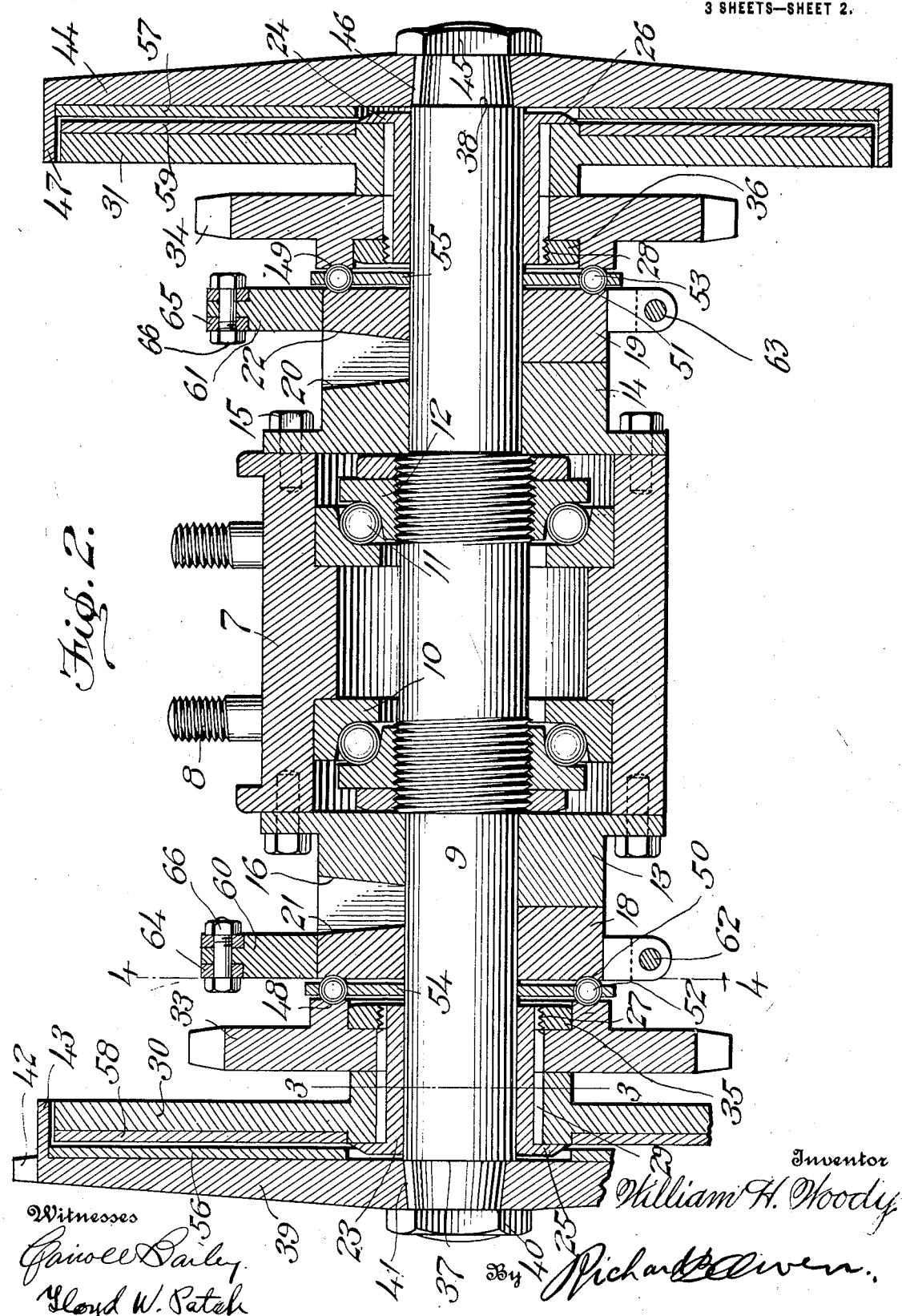

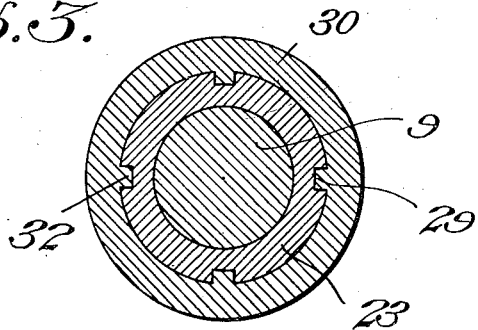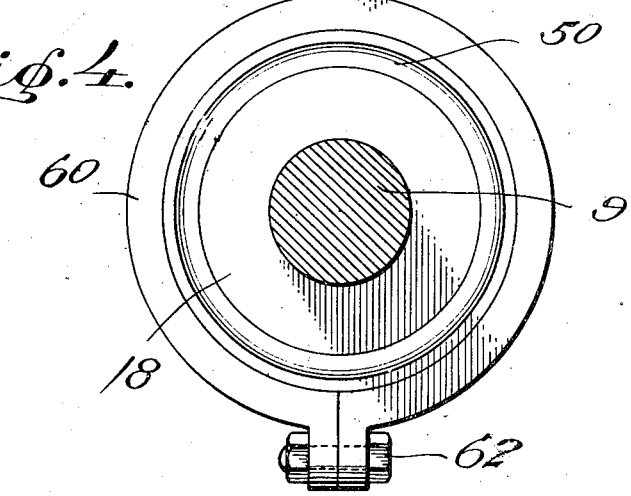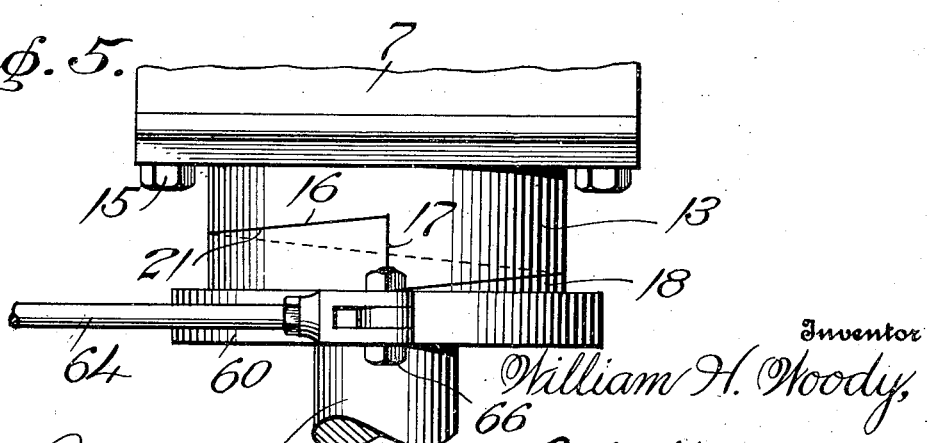

WILLIAM H. WOODY, OF OKLAHOMA, OKLAHOMA.

TWO-SPEED CLUTCH AND BRAKE.

1,197,002.  Specification of Letters Patent.  Patented Sept. 5, 1916.

Application filed January 18, 1915. Serial No. 2,944.

*To all whom it may concern:*

Be it known that I, WILLIAM H. WOODY, a citizen of the United States, residing at Oklahoma city, in the county of Oklahoma and State of Oklahoma, have invented certain new and useful Improvements in Two-Speed Clutches and Brakes, of which the following is a specification.

An object of my invention is to provide a combined change speed and clutch mechanism which may be connected in the transmission from the engine to the drive wheel of a motor cycle, and which is so arranged that transmission for either speed is through a dry-plate clutch.

A further object is to construct a two-speed clutch and brake in which the transmission of power is in a smooth, even stream, the system being selective in that either speed can be obtained direct from the neutral without passage to the other speed, and no appreciable jerk or jar is encountered by the throwing in of the clutch to either speed.

Yet another object is to so arrange the parts of the device that the speed change mechanism can be simultaneously shifted to an operative relation and the difference in the ratio of speed at which the drive wheel is carried forward by the separate sets will cause a braking action which will be increased in power as the clutch plates are brought more firmly to the operative relation.

A still further object is to provide a mechanism to accomplish the above result which is constructed and arranged in a manner that the entire control of the same is accomplished by the use of the feet, thus leaving the hand free, and simultaneous shift of the speed change mechanism to the braking position is by a natural movement of the feet and a holding back positioning of the same as unconsciously assumed.

With other objects in view which will be referred to, my invention consists in the peculiar combination and novel arrangement of parts, such as will be hereinafter more fully described in connection with the accompanying drawings and more particularly pointed out in the appended claims.

In the drawings:—Figure 1 is a view in side elevation of a motor cycle showing the position of the parts with my invention applied thereto. Fig. 2 is a longitudinal vertical sectional view taken through the speed shift mechanism. Fig. 3 is a transverse sectional view taken on the line 3—3 of Fig. 2. Fig. 4 is a view similar to Fig. 3 taken on the line 4—4 of Fig. 2. Fig. 5 is a view in top elevation of the disclosure in Fig. 4. Fig. 6 is a longitudinal sectional view taken through the rear wheel hub to better illustrate the structure and relation of the parts thereof.

The frame 1 of the machine may be of the standard design and construction, and may be mounted to be supported by and carried on the wheels 2 and 3. The engine 4, which in the present disclosure is shown as of the twin-cylinder type has a chain sprocket 5 mounted on the crank shaft 6 thereof to be constantly driven during the normal operation of the engine.

A bearing casting 7 has bolt lugs 8 connected therewith to permit attachment of the casting to the frame in the rear of the engine shaft, and a clutch shaft 9 is mounted through this bearing casting 7, the ball races 10 being carried by the casting and having the balls 11 mounted within these races and the cone 12 secured on the shaft 9 bearing thereagainst. The ball races 10 are provided at each side of the casting 7 and in consequence the clutch shaft 9 is mounted in a full floating relation and is held against endwise thrust or lateral twisting movement.

Sleeve blocks 13 and 14 are secured to the opposite ends of the bearing casting 7 by means of bolts 15 or in any other suitable manner, and the shaft 9 passes through the openings of the sleeve blocks to have free turning movement therein. In Fig. 5, I have illustrated the structure of the sleeve block 13 more in detail, and as is here illustrated, the outer face of this block is formed in a stepped cam surface 16 which has a gradual rise from the lowest point adjacent the shoulder 17 entirely around the extent thereof to the highest point or the point of again meeting the shoulder 17. Cam blocks or clutch shifting cams 18 and 19 are mounted on the shaft 9 adjacent the mounting of the sleeve blocks 13 and 14, and the mounting is so formed that these blocks 18 and 19 are capable of endwise shifting movement and also permit free turning of the shaft 9 therethrough. While I heretofore set forth the structure of the sleeve block 13, it will be understood that sleeve block 14 has the outer face thereof made in a cam surface 20 which corresponds to the cam surface 16 of the block 13, the surface 20, however, being cut in a reverse relation. The cam blocks 18 and 19 have the cam surfaces 21 and 22, which, as better illustrated in Fig. 5, are shaped to fit the cam surfaces 16 and 20 of the sleeve blocks 13 and 14, respectively, to which these cam blocks are placed adjacent.

Sleeves 23 and 24 are loosely mounted on the ends of the clutch shaft 9 to be capable of endwise shifting movement and these sleeves have head flanges 25 and 26 provided around the outer ends thereof, the inner ends being provided with the screw threads at 27 and 28. The sleeves 23 and 24, as is better illustrated in Fig. 3, are provided with a plurality of key slots 29 which extend longitudinally thereof. Clutch plates 30 and 31 are provided with key portions 32 which are received in the keyslots 29 as the plates 30 and 31 are fitted over the sleeves 23 and 24 and are brought to a bearing engagement against the inner faces of the flanges 25 and 26. Chain sprockets 33 and 34 are provided with keys similar to the keys 32 of the plates, and as these chain sprockets 33 and 34 are fitted to the sleeves 23 and 24 and are brought to a point of bearing against the hubs of the plates 30 and 31, the sprockets will be held against turning movement, and when the clamping nuts 35 and 36 are tightened on the screw threads 27 and 28 of the sleeve members 23 and 24, the plate 30 and the sprocket 33 will be clamped and secured as a unit with the sleeve 23, and the corresponding plate 31 and the chain sprocket 34 will be mounted in a like manner with the sleeve 24.

The ends of the clutch shaft 9 are turned down or otherwise formed to a less diameter than the main extent of the shaft and the shoulders 37 and 38 are thus provided. A friction plate 39 is mounted over the reduced portion at one end of the shaft to abut against the shoulder 37 and is held in place by means of a clamp nut 40, a key 41 being provided to hold the disk against turning movement with respect to the shaft, and this clutch disk 39 has sprocket teeth 42 provided around the periphery thereof, a flange 43 being formed to extend from the inner face of the plate and to overhang and incase the outer end of the clutch plate 30. A friction clutch plate 44 similar to the plate 39 is received over the reduced opposite end of the shaft 9 and is held in an abutting relation against the shoulder 38 by a clamping nut 45, a key 46 being provided to hold the plate 44 in a fixed relation on the shaft, and an inwardly extending flange 47 received around and incasing the clutch plate 31.

A ball race 48 is formed upon the inner face of the chain sprocket 33 and the chain sprocket 34 has a similar race 49. The cam blocks 18 and 19 have correspondingly formed ball races 50 and 51, and the balls 52 and 53 are held in the proper relation to work within these annular ball races by the cage members 54 and 55.

The friction clutch plates 39 and 44 have steel or other hardened clutch faces 56 and 57, and flexible linings 58 and 59 are carried by the clutch plates 30 and 31 to be brought to a bearing against the hardened plates 56 and 57, the flexible plate acting to secure the proper friction and the hardened plate to prevent wear of the parts or jamming of the clutch.

From the structure hereinbefore set forth, it will be seen that the turning of the cam blocks 18 and 19 in a forward direction will cause these blocks to be moved along the clutch shaft 9 to exert a bearing through the balls 52 and 53 against the chain sprockets 33 and 34 and to consequently cause movement of the sleeves 23 and 24 endwise along the shaft to a position that the clutch linings 58 and 59 are brought into bearing engagement with the hardened plates or linings 56 and 57 and that the degree of movement of the cam blocks will determine the pressure exerted in the frictional contact. To provide means by which the cam blocks 18 and 19 may be turned, the split clamp rings or collars 60 and 61 having bearing lugs projecting therefrom are received around the cam blocks and are held in place thereon by clamp bolts 62 and 63, this fastening makes it possible to secure the clamp rings in a rigid relation with respect to the cam blocks. Draw rods 64 and 65 are pivotally connected by the bolts 66 with the bearing lugs of the clamp rings 60 and 61, respectively, and it will thus be seen that endwise movement imparted to the draw rods 64 and 65 will cause forward and return movement of the cam blocks 18 and 19 and will determine the relative position of the movable clutch plates with respect to the clutch plates which are rigidly mounted on the clutch shaft 9.

As has been hereinbefore stated, the bearing casting 7 is mounted in the rear of the positioning of the crank shaft 6 and it is preferable that mounting of this casting be in such relation that the clutch shaft 9 will be on a line drawn between the center of the crank shaft 6 and the center of mounting of the rear wheel 3 of the motor cycle. With the parts mounted in this relation, the clutch plate 39 is in a plane with the chain sprocket 5 carried by the crank shaft 6 and a sprocket chain 67 is mounted over the sprocket 5 and the teeth 42 on the clutch plate 39 in a relation that this plate and consequently the clutch shaft 9 will be constantly rotated during the operation of the engine. The ratio of the chain sprocket 5 and the chain sprocket formed by the placing of the teeth 42 is 3–8, and the ratio between the sprockets 33 and 34 as loosely carried on the clutch shaft 9 and this sprocket plate 39 is 5–8, it being understood of course that these figures are here given for the sake of illustration, and may be varied in any ratio in the device as manufactured and adopted for use.

A perfectly rigid hub is provided for the rear wheel 3 and is better illustrated in Fig. 6. This mounting comprises the hub shell 68 which has the spoke flanges 69 formed around the periphery thereof at either end, and which is provided with suitable ball bearings in its mounting upon the axle 70, this axle 70 being constructed to be secured rigidly within the rear forks of the frame 1. A sprocket 71 is carried by and secured on the hub shell 68 at one end beyond the spoke flange and a relatively smaller chain sprocket 72 is secured in a like relation at the opposite end of the hub shell, the positioning of the chain sprockets 71 and 72 being such that they are in a plane with the chain sprockets 33 and 34 mounted on the clutch shaft 9. While it will be obvious that no limitation is to be here made as to the relative size of these oppositely disposed sprockets, in connection with the relative ratio as has been set forth heretofore, it might be desirable to provide the chain sprocket 71 with forty-three teeth, and this sprocket will hereinafter be referred to as the low speed sprocket, whereas the chain sprocket 72 may have thirty-one teeth, this sprocket acting as a high speed drive.

It is desirable that the draw rods 64 and 65 be operated by use of the feet and that all levers which will require the hand being taken from the handle bars be dispensed with thus leaving the hand entirely free for the steering of the machine and the control of the engine, and to this end, I provide the treadle pieces 73 which are connected near their center at 74 to the crank case of the motor to permit swinging in the one direction by pressure of the toe and swinging in the opposite direction by exerting a pressure through the heel, a heel rest being provided at 75 to hold the foot in the proper relation. The arms 76 are extended from these treadle pieces 73 at a point adjacent the pivotal mounting thereof, and at their upper ends these arms are connected with the draw rods 64 and 65 on the opposite sides of the crank case, the positioning of the treadle pieces being such with respect to the feet mounted on the frame that the feet may be maintained upon these treadles with comfort to the rider. As the pressure is exerted by the toe upon the forward arm of the treadle piece, a drawing tension is exerted upon the draw rod, and the cam block connected therewith is shifted in a forward direction to cause pressure to the bearing against the loosely mounted clutch plate positioned adjacent the cam block. By the engagement of the cam block with the loosely mounted clutch plate adjacent thereto, this clutch plate is given movement along the clutch shaft 9 and caused to rotate with this shaft by the movement transmitted to the sprocket chain 67, and the loosely mounted clutch plate and the sprocket connected therewith will be carried with the contacting rigid clutch plate. Motion will be transmitted to the hub 68 through either the sprocket 71 or the sprocket 72 as the case may be. As a means of giving the rider still greater freedom in the use of the machine, the spring catches 77 are mounted on the frame adjacent the forward ends of the treadle members 73 and as these forward ends are depressed, the spring catch members 77 will engage over the treadle pieces and hold the same with the draw rods exerting a forward pull against the cam blocks to hold the same in a relation that the adjacent chain sprockets will be operated through the frictional engagement of the clutch plate carried therewith, and the rider may then remove the foot from the treadle piece and may use the foot rest 78 if he so desires, the simple pressure of the toe against the upper end of the spring latch key 77 being all that is necessary to release the treadle piece from the locked relation and to permit free manual operation thereof.

Any desired means of starting the motor, as for instance a crank arm 79 on the plate or disk 39, which crank arm may be given an initial impetus by hand or is adaptable for the kick start, may be adapted to turn the engine shaft over, and when this initial movement is given to the disk 39, a relatively small movement of the disk will, through the variation in size of this disk and the sprocket 5, cause a complete turning over, or a revolution of the crank shaft 6. It will be understood that the remaining parts of the engine and frame structure may be of the standard form, connection, and operation.

In the operative use of the device of my invention, the engine will be started and through the fact that the heel rests 75 of the treadle pieces 73 are weighted and consequently may bring each of the cam blocks normally into an inoperative relation, the engine is working in neutral and rotary motion is being transmitted to the clutch shaft 9 through the connection of the plate 39. The rider places his feet upon the treadles 73 and pressure exerted with the toe upon the forward end of one of the treadle members will cause the cam blocks connected therewith to be turned forwardly and to consequently exert an endwise thrust bearing upon the clutch plate mounted adjacent thereto to bring this movable clutch plate into an operative bearing position against the rotating clutch plate fixed on the clutch shaft 9, and the chain sprocket carried with the movable clutch plate will be given rotary motion with the clutch shaft 9 which will be transmitted through the sprocket chain 80 from the sprocket 33 to the sprocket 71, or from sprocket 34 through the chain 81 to the sprocket 72 carried by the drive wheel hub 68, as the case may be and as the one lever or the other may be operated. When it is desired to accomplish a breaking action to stop the rotation of the rear wheel, downward pressure will be exerted upon the forward end of each of the treadle pieces 73 and in consequence the clutch plates 30 and 31 will be simultaneously thrown into operative engagement with the rotating clutch plates 39 and 44, and through the variation in the size of the sprockets 71 and 72 carried by the rear hub, and the corresponding variance in the driving speed, the action of the drive on the one side will be to increase the speed or rate of rotation transmitted through the opposite side, whereas the larger gear will have a tendency to decrease the speed transmitted to the smaller gear and this consequent variation of the speed and counterdraft will cause the rotation of the driving hub 68 to be stopped, or a partial braking action may be accomplished by a partial depression of the forward end of each of the treadle pieces 73 and permitting one of the movable clutch braces placed to have slight sliding movement with the rotating clutch plate adjacent thereto. Also, while but two positive speeds are given with the parts shifted to their positively operating and locked relation, any number of variations and any degree of variation may be obtained by increasing and decreasing the frictional bearing of the operative movable clutch plate with the corresponding rotating clutch plate.

From the foregoing it will be seen that I have provided a change speed and clutch mechanism which is so arranged that the speed can be regulated from zero or the neutral point to the maximum drive of the engine, the feet being used to control the mechanism and the pressure exerted by either foot determining the grip and amount of power transmitted to the rear or driving wheel. Further, it will be seen that this mechanism provides a flexible connection between the engine and the driving unit, permitting control independently of the driving wheel, and that the clutch permits changing from the one positive speed to the other without any perceptible jerk or jar and allows the braking action to be exerted against the driving wheel gradually. Still further, it will be noted that the device of my invention may be operated and controlled at all times and under any traffic conditions without the necessity of removing either hand from the handle bars and that in addition there are no gears which will strip. Also no clutches nor pawl and ratchet arrangements which will jam are used and the parts are so constructed and arranged that a minimum of wear is permitted and a maximum of flexibility of adjustment and transmission of power is accomplished.

While I have herein shown and described one specific form of my invention, it will be understood that slight changes might be made in the form and arrangement of the several parts of the mechanism without departing from the spirit and scope of my invention, and hence I do not wish to be limited thereto except for such limitations as the claims may import.

I claim:—

1. A change speed mechanism comprising a shaft arranged to be constantly operated, a pair of clutches mounted on the ends of said shaft to be carried therewith, a pair of sprockets of equal size mounted adjacent said clutches to be capable of turning movement on the shaft, clutch members mounted to rotate with said sprocket wheels, a driven part, a pair of sprocket wheels of different sizes carried by the part to be driven, a driving connection from each of the sprocket wheels on the shaft to one of the sprocket wheels of the driven part, and means by which said first mentioned sprocket wheels and the clutch members carried thereby may be shifted selectively into operative relation to vary the speed of transmission, and may be brought to a relation to cause simultaneous operation to accomplish a braking action.

2. A change speed mechanism comprising a shaft arranged to be constantly operated, a pair of clutches mounted on the ends of said shaft to be carried therewith, a pair of sprockets of equal size mounted adjacent said clutches to be capable of turning movement on the shaft, clutch members mounted to rotate with said sprocket wheels, a driven part, a pair of sprocket wheels of different sizes carried by the part to be driven, a driving connection from each of the sprocket wheels on the shaft to one of the sprocket wheels of the driven part, and cams arranged on the shaft adjacent the mounting of the sprocket wheels to be capable of operative movement to cause shifting of the sprocket wheels and the clutch members associated therewith to lock the same in a driving relation with respect to the clutches carried by the shaft.

3. A change speed mechanism comprising a shaft arranged to be constantly operated, a pair of clutches mounted on the ends of said shaft to be carried therewith, a pair of sprockets of equal size mounted adjacent said clutches to be capable of turning movement on the shaft, clutch members mounted to rotate with said sprocket wheels, a driven part, a pair of sprocket wheels of different sizes carried by the part to be driven, a driving connection from each of the sprocket wheels on the shaft to one of the sprocket wheels of the driven part, and cams arranged on the shaft adjacent the mounting of the sprocket wheels to be capable of operative movement to cause shifting of the sprocket wheels and the clutch members associated therewith to lock the same in a driving relation with respect to the clutches carried by the shaft, said cams being adapted to be selectively operated to cause a variation in the speed of transmission and to be simultaneously operated to cause a counter operation of said change speed means and to thus accomplish a braking action.

4. A change speed mechanism comprising a clutch shaft mounted to be capable of revoluble movement, a clutch member mounted at each end of this shaft, sprocket teeth formed on one of said clutch members to provide a power connection to cause the shaft to be constantly rotated, clutch members mounted loosely on said shaft adjacent the clutches secured thereon, sprocket wheels of equal size and provided with an equal number of teeth mounted to be carried with the loosely mounted clutch members, power connections from said sprocket wheels to cause transmission of movement at varied speeds, and means to be manually operated to cause bodily movement of said clutch members and the sprocket wheels carried therewith into the engagement with the clutches carried by the shaft to cause turning of the sprocket wheels.

5. A change speed mechanism comprising a casing, a shaft revolubly mounted in said casing, a clutch plate secured on each end of said shaft, sprocket teeth formed on one of said clutch plates to provide a driving connection to cause the shaft to be constantly rotated, clutch members loosely mounted on said shaft adjacent the clutch plates, chain sprockets associated with said clutch members to be movable therewith and connected thereto, and cam means mounted on the shaft to be capable of turning movement relative thereto and to have bearing engagement with the casing as they are turned to cause the loosely mounted clutch members to be engaged with the clutch plates to thus connect the chain sprockets to rotate with the shaft.

6. A change speed mechanism comprising a casing, a clutch shaft revolubly mounted in said casing with the ends thereof projecting from the casing, a clutch plate secured on each end of said shaft, a chain sprocket formed on one of said clutch plates to provide a driving connection to cause the shaft to be constantly rotated, clutch members loosely mounted on said shaft adjacent the clutch plates, chain sprockets of equal size connected with said clutch members, a driven shaft, chain sprockets of different sizes secured on said driven shaft, a driving connection from each of the chain sprockets on the clutch shaft to one of the chain sprockets on the driven shaft, and means to be manually moved to cause the clutch members to be selectively brought into engagement with the clutch plates to vary the speed of transmission and to be simultaneously brought to the locked relation with the clutch plates to cause a braking action on the driven shaft.

7. A change speed mechanism comprising a casing, a clutch shaft revolubly mounted in said casing with the ends thereof projecting from the casing, a clutch plate secured on each end of said shaft, a chain sprocket formed on one of said clutch plates to provide a driving connection to cause the shaft to be constantly rotated, clutch members loosely mounted on said shaft adjacent the clutch plates, chain sprockets of equal size connected with said clutch members, a driven shaft, chain sprockets of different sizes secured on said driven shaft, a driving connection from each of the chain sprockets on the clutch shaft to one of the chain sprockets on the driven shaft, a cam portion formed at each side of the casing adjacent the mounting of the clutch shaft therethrough, and cam members revolubly mounted on the clutch shaft having engagement with the cam portions of the casing and adapted to be selectively turned to cause the clutch members to be engaged with the clutch plates to vary the speed of operation of the driven shaft and to be simultaneously brought to the locked relation against the clutch plates to cause a braking action on the driven shaft.

8. A change speed mechanism comprising a casing, a clutch shaft revolubly mounted in said casing with the ends thereof projecting from the casing, a clutch plate secured on each end of said shaft, a chain sprocket formed on one of said clutch plates to provide a driving connection to cause the shaft to be constantly rotated, clutch members loosely mounted on said shaft adjacent the clutch plates, chain sprockets of equal size connected with said clutch members, a driven shaft, chain sprockets of different sizes secured on said driven shaft, a driving connection from each of the chain sprockets on the clutch shaft to one of the chain sprockets on the driven shaft, a cam portion formed at each side of the casing adjacent the mounting of the clutch shaft therethrough, cam members revolubly mounted on the clutch shaft having engagement with the cam portions of the casing and adapted to be selectively turned to cause the clutch members to be engaged with the clutch plates to vary the speed of operation of the driven shaft and to be simultaneously brought to the locked relation against the clutch plates to cause a braking action on the driven shaft, and manually movable means by which said cam members are given the proper rotary movement to bring the same to the operative relation.

In testimony whereof I affix my signature in presence of two witnesses.

WILLIAM H. WOODY.

Witnesses:
C. EVERETT LANCASTER,
M. E. JONES.